United States Patent [19]
Chen et al.

[11] Patent Number: 6,066,251
[45] Date of Patent: May 23, 2000

[54] REFORMING PROCESS USING A CATALYST SYSTEM WITH DIFFERENTIATED ACID PROPERTIES

[75] Inventors: Qianjun Chen, Des Plaines; Paula L. Bogdan, Mount Prospect, both of Ill.

[73] Assignee: UOP LLC, Des Plaines, Ill.

[21] Appl. No.: 09/211,789

[22] Filed: Dec. 15, 1998

Related U.S. Application Data

[62] Division of application No. 08/735,833, Oct. 23, 1996, Pat. No. 5,880,051.
[51] Int. Cl.$^7$ ................................................ C10G 35/095
[52] U.S. Cl. ........................................ 208/138; 208/135
[58] Field of Search ...................................... 208/135, 138

[56] References Cited

U.S. PATENT DOCUMENTS

| | | | |
|---|---|---|---|
| 4,191,638 | 3/1980 | Plank et al. | 208/139 |
| 4,418,006 | 11/1983 | Kim et al. | 502/73 |
| 5,314,854 | 5/1994 | Galperin | 502/66 |

FOREIGN PATENT DOCUMENTS

246555 A1  10/1987  Germany ................ C10G 47/16

*Primary Examiner*—Thomas Dunn
*Attorney, Agent, or Firm*—Thomas K. McBride; John F. Spears, Jr.; Richard E. Conser

[57] ABSTRACT

A catalyst system comprising a physical mixture of particles of a non-acidic large-pore zeolite containing a platinum-group metal and particles comprising a refractory inorganic oxide which is metal-free is effective for the reforming of a hydrocarbon feedstock. Reforming of paraffinic feedstocks to effect aromatization, particularly of a raffinate from aromatics extraction, provides improved activity in producing gasoline-range products when using the catalyst system of the invention.

7 Claims, 8 Drawing Sheets

6,066,251

REFORMING PROCESS USING A CATALYST SYSTEM WITH DIFFERENTIATED ACID PROPERTIES

CROSS-REFERENCE TO RELATED APPLICATION

This application is a division of prior application Ser. No. 08/735,833, filed Oct. 23, 1996 now U.S. Pat. No. 5,880,051, the contents of which are incorporated herein by reference.

BACKGROUND OF THE INVENTION

1. Field of the Invention

This invention relates to an improved catalyst system and process for the conversion of hydrocarbons, and more specifically for the catalytic reforming of gasoline-range hydrocarbons.

2. General Background

The catalytic reforming of hydrocarbon feedstocks in the gasoline range is an important commercial process, practiced in nearly every significant petroleum refinery in the world to produce aromatic intermediates for the petrochemical industry or gasoline components with high resistance to engine knock. Demand for aromatics is growing more rapidly than the supply of feedstocks for aromatics production. Moreover, the widespread removal of lead antiknock additive from gasoline and the rising demands of high-performance internal-combustion engines are increasing the required knock resistance of the gasoline component as measured by gasoline "octane" number. The catalytic reforming unit therefore must operate more efficiently at higher severity in order to meet these increasing needs for chemical aromatics and gasoline-octane. This trend creates a need for more effective reforming processes and catalysts.

Catalytic reforming generally is applied to a feedstock rich in paraffinic and naphthenic hydrocarbons and is effected through diverse reactions: dehydrogenation of naphthenes to aromatics, dehydrocyclization of paraffins, isomerization of paraffins and naphthenes, dealkylation of alkylaromatics, hydrocracking of paraffins to light hydrocarbons, and formation of coke which is deposited on the catalyst. Increased aromatics and gasoline-octane needs have turned attention to the paraffin-dehydrocyclization reaction, which is less favored kinetically in conventional reforming than formation of aromatics from naphthenes. Catalyst acidity, and particularly Bronsted acidity, has been considered to be adverse to enhanced paraffin aromatization.

The effectiveness of reforming catalysts comprising a non-acidic L-zeolite and a platinum-group metal for dehydrocyclization of paraffins is well known in the art. The use of these reforming catalysts to produce aromatics from paraffinic raffinates as well as naphthas has been disclosed. Nevertheless, commercialization of this dehydrocyclization technology has been slow following an intense and lengthy development period. Catalyst selectivity, stability, and sensitivity to contaminants such as sulfur offer potential for improvement. Increased isomerization of residual paraffins and reduced dealkylation of alkylaromatics are goals within these broader objectives.

U.S. Pat. No. 4,191,638 (Unmuth et al.) discloses reforming with a catalyst combination comprising a zeolite and a conventional catalyst. Both the zeolite and the conventional catalyst comprise a platinum-group metal and a halide, and thus are acidic. Examples of zeolites are ZSM-5, CaY and TEA-mordenite.

U.S. Pat. No. 4,418,006 (Kim et al.) discloses a physical particle-form mixture of a first catalyst which is free of zeolite and comprises a noble metal and halogen and a second catalyst comprising a zeolite and non-noble metal free of noble metals. The preferred catalyst components comprise platinum on chlorided alumina and Re, Ga or W on mordenite.

U.S. Pat. No. 5,314,854 (Galperin) teaches a bed of catalyst particles comprising a multigradient noble-metal component.

German Democratic Republic patent specification 246 555, assigned to VEB Leuna-Werke "Walter Ulbricht," discloses a catalyst mixture comprising erionite or LZ-40 type, alumina, platinum, and optionally rhenium.

None of the references disclose a physical mixture of a non-acidic large-pore zeolite comprising a platinum-group component and an acidic refractory inorganic oxide having the absence of a platinum-group metal.

SUMMARY OF THE INVENTION

It is an object of the present invention to provide an improved catalyst system for the reforming of hydrocarbons. A corollary objective is to effect aromatization of a paraffinic hydrocarbon feedstock with a favorable yield of gasoline-range product.

This invention is based on the discovery that catalytic reforming of a naphtha feedstock using a physical mixture of particles of platinum on a non-acidic L-zeolite and of an acidic inorganic oxide provide improved activity and/or yield of gasoline-range product.

A broad embodiment of the present invention is a catalyst system comprising a physical particle-form mixture of first particles comprising a non-acidic large-pore zeolite and a platinum-group metal and second acidic particles comprising one or more inorganic oxides and having the absence of a platinum-group metal. The large-pore zeolite preferably comprises L-zeolite, especially potassium-form L-zeolite. The second particles generally have measurable Bronsted acidity, determinable by TMP MASNMR, and optimally comprise two or more inorganic oxides. Alumina is a preferred inorganic oxide, with boria and silica comprising preferred alternative components of the second particles. Boria-alumina and silica-alumina are especially preferred components of the second particles.

In another aspect, the invention comprises a reforming process using a catalyst system comprising a physical mixture of first particles comprising a non-acidic acidic large-pore zeolite and a platinum-group metal and second particles comprising one or more inorganic oxides and having the absence of a platinum-group metal to upgrade a hydrocarbon feedstock. Preferably, the process comprises aromatization of a paraffinic naphtha-range feedstock. Raffinate from aromatics extraction is an especially preferred feedstock.

These as well as other objects and embodiments will become apparent from the detailed description of the invention.

DESCRIPTION OF THE PREFERRED EMBODIMENTS

Figure 1:
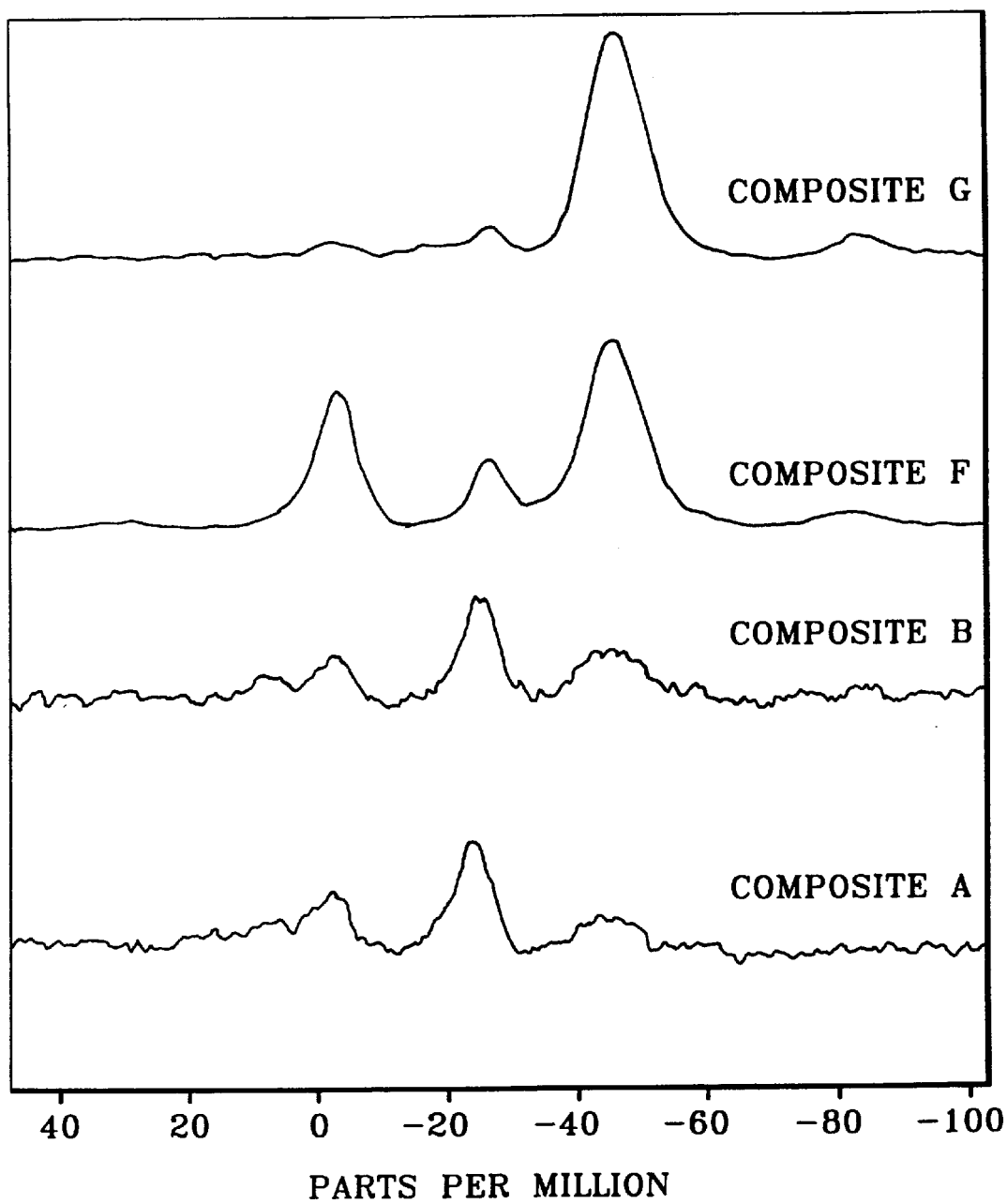
FIG. 1 shows $^{31}P$ proton-decoupled MASNMR spectra at TMP exposure for various boria-alumina samples.

To reiterate, a broad embodiment of the present invention is directed to a catalyst system comprising a physical mixture of first particles comprising a non-acidic large-pore zeolite and a platinum-group metal and second acidic particles comprising one or more inorganic oxides and having the absence of a platinum-group metal, and to a reforming process using the catalyst system of the invention in a reforming process to upgrade a hydrocarbon feedstock.

The hydrocarbon feedstock comprises paraffins and naphthenes, and may comprise aromatics and small amounts of olefins, boiling within the gasoline range. Feedstocks which may be utilized include straight-run naphthas, natural gasoline, synthetic naphthas, thermal gasoline, catalytically cracked gasoline, partially reformed naphthas or raffinates from extraction of aromatics. The distillation range may be that of a full-range naphtha, having an initial boiling point typically from 40°–80° C. and a final boiling point of from about 150°–210° C., or it may represent a narrower range within a lower final boiling point. Light paraffinic feedstocks, such as naphthas from Middle East crudes having a final boiling point of between about 80° and 150° C., are preferred due to the specific ability of the process to dehydrocyclize paraffins to aromatics. Raffinates from aromatics extraction, containing principally low-value $C_6$–$C_8$ paraffins which can be converted to valuable B-T-X aromatics, are especially preferred feedstocks.

The hydrocarbon feedstock to the present process contains small amounts of sulfur compounds, amounting to generally less than 10 parts per million (ppm) on an elemental basis. Preferably the hydrocarbon feedstock has been prepared from a contaminated feedstock by a conventional pretreating step such as hydrotreating, hydrorefining or hydrodesulfurization to convert such contaminants as sulfurous, nitrogenous and oxygenated compounds to $H_2S$, $NH_3$ and $H_2O$, respectively, which can be separated from the hydrotreated hydrocarbons by fractionation. This conversion preferably will employ a catalyst known to the art comprising an inorganic oxide support and metals selected from Groups VIB(6) and VIII(9-10) of the Periodic Table. [See Cotton and Wilkinson, *Advanced Inorganic Chemistry*, John Wiley & Sons (Fifth Edition, 1988)]. Good results are obtained with a catalyst containing from about 5 to 15 mass % molybdenum or tungsten and from about 2 to 5 mass % cobalt or nickel. Conventional hydrotreating conditions are sufficient to effect the needed degree of sulfur removal including a pressure of from about atmospheric to 100 atmospheres, a temperature of about 200° to 450° C., liquid hourly space velocity of from about 1 to 20, and hydrogen to hydrocarbon mole ratio of between about 0.1 and 10.

Alternatively or in addition to the conventional hydrotreating, the pretreating step may comprise contact with sorbents capable of removing sulfurous and other contaminants. These sorbents may include but are not limited to zinc oxide, iron sponge, high-surfacearea sodium, high-surface-area alumina, activated carbons and molecular sieves. The art, including U.S. Pat. Nos. 4,028,223, 4,929, 794, and 5,035,792 which are incorporated herein by reference, teaches that a nickel sorbent is effective for removing sulfur from hydrocarbons which subsequently are processed over a sulfur-sensitive catalyst. The nickel preferably is substantially in reduced form and is combined with an inert binder to provide a bed of particles; the nickel usually amounts to between 20 and 90 mass %, preferably 30 to 70 mass %, of the total sorbent composite on an elemental basis. Excellent results are obtained with a nickel-on-alumina sorbent, and alternative preferred binders comprise clay, kieselguhr, or silica. The nickel may be composited with the binder by any effective means to provide active bound nickel, such as coextrusion and impregnation. The composite of nickel and binder usually is calcined and reduced according to procedures known in the art. A sorbent pretreating step using the nickel sorbent generally is conducted in the liquid phase at between atmospheric and 50 atmospheres pressure and a temperature of between about 70° and 200° C., and optimally between 100° and 175° C. Liquid hourly space velocity can vary widely between about 2 and 50 depending on feed sulfur content, product sulfur and resulting sorbent utilization, desired run length and use of a single or parallel swing beds. Preferably, the pretreating step will provide the reforming catalyst with a hydrocarbon feedstock having low sulfur levels disclosed in the prior art as desirable reforming feedstocks, e.g., 1 ppm to 0.1 ppm (100 ppb). It is within the ambit of the present invention that the pretreating step be included in the present reforming process.

The reforming process contains a catalyst system comprising a physical mixture of first particles comprising a non-acidic large-pore zeolite and a platinum-group metal and second acidic particles comprising one or more inorganic oxides and having the absence of a platinum-group metal. The particles can be thoroughly mixed using known techniques such as mulling to intimately blend the physical mixture. The mass ratio of first particles to second particles depends on the nature of the feedstock and the process objectives, and may range from about 1:10 to 10:1. Preferably, a 100 cc sample of a contemporaneously mixed batch will not differ in the percentage of each component of the mixture relative to the batch by more than about 10%. Although the first and second particles may be of similar size and shape, the particles preferably are of different size and/or density for ease of separation for purposes of regeneration or rejuvenation following their use in hydrocarbon processing.

The first particles contain a non-acidic largepore zeolite. Suitable zeolites generally have a maximum free-channel diameter or "pore size" of at least about 6 Å, and preferably have a moderately large pore size of about 7 to 8 Å as defined in the *Atlas of Zeolite Structure Types* issued by the Structure Commission of the International Zeolite Association. Such zeolites include, but are not limited to, those characterized as BEA, FAU, LTL or MAZ structure type by the IUPAC Commission on Zeolite Nomenclature, with the LTL structure or L-zeolite of U.S. Pat. No. 3,216,789 being preferred. FAU is a favored alternative structure, particularly the zeolite Y of U.S. Pat. Nos. 3,130,007; 4,401,556; and 4,795,549 which are incorporated herein by reference thereto.

The first particles thus preferably comprise non-acidic L-zeolite and a platinum-group metal component. It is essential that the L-zeolite be non-acidic, as acidity in the zeolite lowers the selectivity to aromatics of the finished catalyst In order to be "non-acidic," the zeolite has substantially all of its cationic exchange sites occupied by nonhydrogen species. Preferably the cations occupying the exchangeable cation sites will comprise one or more of the alkali metals, although other cationic species may be present. An especially preferred non-acidic L-zeolite is potassium-form L-zeolite.

Usually the L-zeolite is composited with a binder in order to provide a convenient form for use in the catalyst of the present invention. The art teaches that any refractory inorganic oxide binder is suitable. One or more of silica, alumina or magnesia are preferred binder materials of the present invention. One or both of amorphous silica and alumina are especially preferred. Excellent results are obtained when using a synthetic white silica powder precipitated as ultra-fine spherical particles from a water solution. The silica binder preferably is non-acidic, contains less than 0.3 mass % sulfate salts, and has a BET surface area of from about 120 to 160 $m^2/g$. The binder if present comprises from about 1 to 90 mass-% of the zeolite-binder composite, and preferably from about 5 to 80 mass-% of the composite.

The L-zeolite and binder may be composited to form particle shapes known to those skilled in the art such as spheres, extrudates, rods, pills, pellets, tablets or granules. Spherical particles may be formed directly by the oil-drop method as disclosed hereinbelow or from extrudates by rolling extrudate particles on a spinning disk. In one method of forming extrudates, potassium-form L-zeolite and amorphous silica are commingled as a uniform powder blend prior to introduction of a peptizing agent. An aqueous solution comprising sodium hydroxide is added to form an extrudable dough. The dough preferably will have a moisture content of from 30 to 50 mass % in order to form extrudates having acceptable integrity to withstand direct calcination. The resulting dough is extruded through a suitably shaped and sized die to form extrudate particles, which are dried and calcined generally by known methods. Preferably, extrudates are subjected directly to calcination without an intermediate drying step in order to encapsulate potassium ions and preserve basicity. The calcination of the extrudates is effected in an oxygen-containing atmosphere at a temperature of from about 260° to 650° C. for a period of about 0.5 to 2 hours.

An alternative alumina form of the present catalyst support is a sphere. Alumina spheres may be continuously manufactured by the well known oil-drop method which comprises: forming an alumina hydrosol by any of the techniques taught in the art and preferably by reacting aluminum metal with hydrochloric acid; combining the resulting hydrosol with a suitable gelling agent; and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging and drying treatments in oil and an ammoniacal solution to further improve their physical characteristics. The resulting aged and gelled particles are then washed and dried at a temperature of about 50° to about 205° C. and subjected to a calcination procedure at a temperature of about 450° to about 700° C. for a period of about 1 to about 20 hours. This treatment effects conversion of the alumina hydrogel to the corresponding crystalline gamma-alumina. U.S. Pat. Nos. 2,620,314; 3,096,295; 3,496,115; 3,943,070; 4,273,735; 4,514,511 and 4,542,113 provide additional details, and the production of spherical catalyst particles by different methods is described in U.S. Pat. Nos. 4,514,511; 4,599,321; 4,628,040 and 4,640,807; these patents are incorporated herein by reference thereto.

An alkali metal component is a highly preferred constituent of the first catalyst particles. One or more of the alkali metals, including lithium, sodium, potassium, rubidium, cesium and mixtures thereof, may be used, with potassium being preferred. The alkali metal optimally will occupy essentially all of the cationic exchangeable sites of the non-acidic L-zeolite as described hereinabove. Surface-deposited alkali metal also may be present as described in U.S. Pat. No. 4,619,906, incorporated herein by reference thereto.

The platinum-group metal component is another essential feature of the first particles, with a platinum component being preferred. The platinum may exist within the catalyst as a compound such as the oxide, sulfide, halide, or oxyhalide, in chemical combination with one or more other ingredients of the catalytic composite, or as an elemental metal. Best results are obtained when substantially all of the platinum exists in the catalytic composite in a reduced state. The platinum component generally comprises from about 0.05 to 5 mass % of the catalytic composite, preferably 0.05 to 2 mass %, calculated on an elemental basis.

It is within the scope of the present invention that the catalyst may contain other metal components known to modify the effect of the preferred platinum component. Such metal modifiers may include Group IVA(14) metals, Group VIIB(7) metals, other Group VIII(8–10) metals, rhenium, indium, gallium, zinc, uranium, dysprosium, thallium and mixtures thereof. Preferred modifiers include rhenium, indium, and nickel. Embodiment of such multimetallic catalysts are disclosed in U.S. Pat. Nos. 5,314,854 and 5,366,617, incorporated herein by reference. Catalytically effective amounts of such metal modifiers may be incorporated into the catalyst by any means known in the art. Generally the metal modifier is present in a concentration of from about 0.01 to 5 mass % of the finished catalyst on an elemental basis, with a concentration of from about 0.05 to 2 mass % being preferred. The ratio of platinum-group metal to metal modifier is from about 0.2 to 20 on an elemental mass basis, and preferably is from about 0.5 to 10.

The final first particles generally will be dried at a temperature of from about 100° to 320°C. for about 0.5 to 24 hours, followed by oxidation at a temperature of about 300° to 550° C. (preferably about 350° C.) in an air atmosphere for 0.5 to 10 hours. Preferably the oxidized catalyst is subjected to a substantially water-free reduction step at a temperature of about 300° to 550° C. (preferably about 350° C.) for 0.5 to 10 hours or more. The duration of the reduction step should be only as long as necessary to reduce the platinum, in order to avoid pre-deactivation of the catalyst, and may be performed in-situ as part of the plant startup if a dry atmosphere is maintained. Further details of the preparation and activation of embodiments of the first particles are disclosed, e.g., in U.S. Pat. No. 4,619,906 (Lambert et al) and U.S. Pat. No. 4,822,762 (Ellig et al.), which are incorporated into this specification by reference thereto.

The second particles comprise a refractory inorganic oxide which provides acid sites for such reactions as isomerization and cracking. It is believed, without limiting the invention, that Bronsted acidity is an important characteristic of the second particles. Therefore, it is preferable in characterizing the acidity of the second particles that the tests indicate the presence of Brönsted acidity.

A suitable test for determining the acidity of the second particles involves the cracking of 1-heptene, as described in Example II. The composites as 40–60 mesh particles are pretreated at 200° C. for 0.5 hr and 550° C. for 1 hr in a stream of hydrogen and loaded as a 250 mg sample into a microreactor. The test on 1-heptene is carried out at 425° C. at a base rate of 250 cc/min. Brönsted acidity is indicated by a high ratio of propane and butane, generally at least about 80 mass-% and preferably 90 mass-% or more, in the cracked products.

Acidity characteristics of the second particles also may be determined by nuclear magnetic resonance, or NMR, and especially magic-angle spinning NMR, or MASNMR. Samples are loaded as powder in a glass tube and pretreated under high vacuum (ca. $10^{-6}$) torr at 600° C. for 2 hr. The samples are cooled to 120° C., exposed to trimethylphosphine (TMP) for 15 min followed by a 45 min equilibration time, and then degassed with high vacuum. The amount of adsorbed TMP is calculated from the vapor-pressure change after condensation on the samples from the known volume of vacuum line. The total integrated $^{31}P$ NMR signal intensity was calculated for these samples based on the sample mass, number of NMR scans, and the signal size.

Other tests as known in the art, such as ammonia temperature programmed desorption ($NH_3$ TPD) and temperature-programmed pyridine absorbance as characterized by infrared spectra (pyridine TPD FT-IR) may be used to characterize the acidity of the second particles.

The second particles comprise a porous, adsorptive, high-surface-area material, comprising one or more refractory inorganic oxides such as alumina, silica, titania, magnesia, zirconia, chromia, thoria, boria or mixtures thereof. It is within the scope of the present invention that the second particles further contain one or more of: (1) crystalline zeolitic aluminosilicates, either naturally occurring or synthetically prepared such as BEA, FAU, FER, LTL, MAZ, MEL, MFI, MOR, and MTW (IUPAC Commission on Zeolite Nomenclature), in hydrogen form or in a form which has been exchanged with metal cations; (2) non-zeolitic molecular sieves, such as aluminophosphates and silicoaluminophosphates, including but not limited to structure types AEL, AFI, AFO and ATO; (3) synthetically prepared or naturally occurring clays and silicates, which may or may not be acid-treated, for example attapulgus clay, diatomaceous earth, fuller's earth, kaolin and kieselguhr; (4) spinels such as $MgAl_2O_4$, $FeAl_2O_4$, $ZnAl_2O_4$, $CaAl_2O_4$; and (5) combinations of materials from one or more of these groups. Preferably the second particles comprise two or more refractory inorganic oxides selected from alumina, boria, silica, titania and zirconia.

A preferred shape for the second particles is an extrudate. The well-known extrusion method involves mixing the inorganic oxide and any other components with a suitable peptizing agent to form a homogeneous dough or thick paste having a moisture content appropriate for the formation of extrudates with acceptable integrity to withstand direct calcination. Extrudability is determined from an analysis of the moisture content of the dough, with a moisture content in the range of from 30 to 50 wt. % being preferred. The dough is extruded through a die pierced with multiple holes and cut to form particles in accordance with techniques well known in the art. A multitude of different extrudate shapes are possible, including, but not limited to, cylinders, cloverleaf, dumbbell and symmetrical and asymmetrical polylobates. It is also within the scope of this invention that the uncalcined extrudates may be further shaped to any desired form, such as spheres, by any means known to the art. Calcination of the extrudates is effected in an oxygen-containing atmosphere at a temperature of from about 260° to 650° C. for a period of about 0.5 to 2 hours.

An alternative preferred form of the second particles is a sphere formed by use of the well known oil dropping technique substantially as described hereinabove. The sphere preferably comprises alumina, which powder is converted into alumina sol by reaction with suitable peptizing acid and water. A mixture of the resulting sol and gelling agent is discharged while still below gelation temperature by means of a nozzle or rotating disk into a hot oil bath maintained at or above gelation temperature to form spherical particles of an alumina hydrogel which are subjected to known aging, drying and calcination steps. This treatment effects conversion of the hydrogel to the corresponding inorganic oxide matrix.

A preferred refractory inorganic oxide comprises alumina, suitably derived from any of the various hydrous aluminum oxides or alumina gels such as alpha-alumina monohydrate of the boehmite structure, alpha-alumina trihydrate of the gibbsite structure, beta-alumina trihydrate of the bayerite structure, and the like. Gamma- or eta-alumina are particularly preferred. Favorable results are obtained with "Ziegler alumina," described in U.S. Pat. No. 2,892,858 and presently available from the Vista Chemical Company under the trademark "Catapal" or from Condea Chemie GmbH under the trademark "Pural." Ziegler alumina is an extremely high-purity pseudoboehmite which, after calcination at a high temperature, has been shown to yield a high-priority gamma-alumina. It is especially preferred that the refractory inorganic oxide comprise substantially pure Ziegler alumina having an apparent bulk density of about 0.6 to 1 g/cc and a surface area of about 150 to 280 $m^2/g$ (especially 185 to 235 $m^2/g$) at a pore volume of 0.3 to 0.8 cc/g. The inorganic oxide may be formed into any shape or form of carrier material known to those skilled in the art such as spheres, extrudates, rods, pills, pellets, tablets or granules.

In an especially preferred embodiment, the second particles comprise alumina and boria in a mass ratio of from about 1:1 to 100:1. The boria may be composited with the alumina in any manner known in the art. Preferably, boria in the forms of $B_2O_3$ or as tetra- or pyro-boric acid is admixed with the alumina sol before oil dropping or combined with the alumina-containing dough to extrusion. The combined oxides then are processed as described hereinabove to prepare the alumina-boria second particles. Optionally, the particles consist essentially of alumina and boria.

An alternative preferred embodiment of the second particles comprises silica-alumina containing a weight ratio of silica to alumina of at from about 20:1 to about 1:100. Silica:alumina ratios of from about 4:1 up to about 1:20 are preferred. An amorphous, cogelled, oil-dropped silica-alumina is favored, prepared substantially as described hereinabove for alumina spheres. Optimally an alumina sol, utilized as an alumina source, is commingled with an acidified water glass (sodium silicate) solution as a silica source, and the mixture is further commingled with a suitable gelling agent, for example, urea, hexamethylenetetraamine (HMT), or mixtures thereof. The mixture is dispersed into the hot oil bath as droplets which form into spherical gel particles. The spheroidal gel particles may be atmospherically aged, usually in the oil bath, for a period of 6–16 hours, and then washed, preferably with an aqueous ammonia-ammonium nitrate solution, in a suitable alkaline or basic medium for at least 3 to about 10 hours, and finally water rinsed. Pressure aging optionally may be employed to effect a higher aging temperature at superatmospheric pressure in order to maintain water in the liquid phase. The spheres are water-washed, preferably with water containing a small amount of ammonium hydroxide and/or ammonium nitrate. After washing, the spheres are dried at a temperature from about 85°–300° C. for a period from about 6 to about 24 hours or more, and then calcined at a temperature from about 300°–760° C. for a period from about 2 to about 12 hours or more. The sodium content optionally may be reduced by washing the oil-aged spheres with aqueous ammonium hydroxide-ammonium nitrate or washing the calcined base with aqueous HCl, $NH_4NO_3$, $NH_4Cl$, $HNO_3$, $(NH_4)N_3$, for example. Exchange of $H^+$ for alkali metal may be accomplished by cycling the wash solution through a packed bed of the calcined base followed by a water rinse using techniques well known to the skilled worker.

The second particles are substantially free of platinum-group metals. "Substantially free" is defined herein as containing less than about 0.01 mass-% of a platinum-group metal, calculated on an elemental basis. Preferably the second particles are free of any metal component other than the inorganic oxides and molecular sieves disclosed above, and most preferably free of any metal other than those comprising alumina, magnesia, titania, zirconia and boria.

The second particles optionally may contain a halogen component. The halogen component may be either fluorine, chlorine, bromine or iodine or mixtures thereof. Chlorine is the preferred halogen component. The halogen component is generally present in a combined state with the inorganic-oxide support. The halogen component is preferably well dispersed throughout the particles and may comprise from more than 0.2 to about 15 wt. %. calculated on an elemental basis, of the second particles. The particles suitably will be dried at a temperature of from about 100° to 320° C. for about 0.5 to 24 hours, followed by oxidation at a temperature of about 300° to 550° C. in an air atmosphere for 0.5 to 10 hours.

In an alternative embodiment of the present invention, the physical mixture of first particles comprising a non-acidic large-pore zeolite and second acidic particles comprising an inorganic oxide is contained within the same catalyst particle. In this embodiment, the first and second particles may be ground or milled together or separately to form particles of suitable size, preferably less than about 100 microns, which are supported in a suitable matrix. Optimally the matrix is selected from the inorganic oxides described hereinabove.

An optional embodiment of the present invention is a physical mixture of the catalyst system and a sulfur sorbent, i.e., a mixture of first particles, second particles and a sulfur sorbent. The sulfur sorbent should not only be effective for removal of small amounts of sulfur compounds from hydrocarbon streams at reforming-catalyst operating conditions, but also be compatible with the components of the catalyst system in order to maintain the activity of the catalyst. The sulfur sorbent comprises a metal oxide, preferably selected from oxides of the metals having an atomic number between 19 and 30 inclusive; these metals, particularly potassium, calcium, vanadium, manganese, nickel, copper and zinc are known to be effective for sulfur removal in various circumstances. The sorbent optimally comprises a manganese component. Manganese oxide has been found to provide reforming catalyst protection superior to the zinc oxide of the prior art, it is believed, due to possible zinc contamination of associated reforming catalyst. The manganese oxides include MnO, $Mn_3O_4$, $Mn_2O_3$, $MnO_3$, and $Mn_2O_7$. The preferred manganese oxide is MnO (manganous oxide). The manganese component may be composited with a suitable binder such as clays, graphite, or inorganic oxides including one or more of alumina, silica, zirconia, magnesia, chromia or boria in order to provide a second particle for the physical mixture of the present catalyst system. The manganese component preferably is unbound and consists essentially of manganese oxide, especially MnO.

The feedstock contacts the catalyst system of the invention in the reforming process in upflow, downflow, or radial-flow mode. Since the present reforming process operates at relatively low pressure, the low pressure drop in a radial-flow reactor favors the radial-flow mode for a reactor containing a single zone; a downflow reactor is favored when the reactor contains multiple zones. The catalyst or sorbent is contained in a fixed-bed reactor or in a moving-bed reactor whereby catalyst may be continuously withdrawn and added. These alternatives are associated with catalyst-regeneration options known to those of ordinary skill in the art, such as: (1) a semiregenerative unit containing fixed-bed reactors maintains operating severity by increasing temperature, eventually shutting the unit down for catalyst regeneration and reactivation; (2) a swing-reactor unit, in which individual fixed-bed reactors are serially isolated by manifolding arrangements as the catalyst become deactivated and the catalyst in the isolated reactor is regenerated and reactivated while the other reactors remain on-stream; (3) continuous regeneration of catalyst withdrawn from a moving-bed reactor, with reactivation and substitution of the reactivated catalyst, permitting higher operating severity by maintaining high catalyst activity through regeneration cycles of a few days; or: (4) a hybrid system with semiregenerative and continuous-regeneration provisions in the same unit. The preferred embodiment of the present invention is fixed-bed reactors in a semiregenerafive unit.

Operating conditions used in the reforming process of the present invention include a pressure of from about 100 kPa to 6 MPa (absolute), with the preferred range being from about 100 kPa to 2 MPa and a pressure of below 1 MPa being especially preferred. Hydrogen is supplied to the reforming process in an amount sufficient to correspond to a ratio of from about 0.1 to 10 moles of free hydrogen per mole of hydrocarbon feedstock. The volume of the contained reforming catalyst corresponds to a liquid hourly space velocity of from about 1 to 40 $hr^{-1}$. The operating temperature generally is in the range of 260° to 560° C. Hydrocarbon. types in the feed stock influence temperature selection, as naphthenes generally are dehydrogenated over the reforming catalyst with a concomitant decline in temperature across the catalyst bed due to the endothermic heat of reaction. The temperature generally is slowly increased during each period of operation to compensate for the inevitable catalyst deactivation.

Since the predominant reaction occurring in the reforming process is the dehydrocyclization of paraffins to aromatics, this zone comprises two or more reactors with interheating between reactors to compensate for the endothermic heat of reaction and maintain dehydrocyclization conditions. The reforming process produces an aromatics-rich effluent stream, with the aromatics content of the $C_5+$ portion of the effluent typically being within the range of about 45 to 85 mass-%. The composition of the aromatics depends principally on the feed-stock composition and operating conditions, and generally comprises principally $C_6$–$C_{12}$ aromatics. Benzene, toluene and $C_8$ aromatics will be the primary aromatics produced from the preferred light naphtha and raffinate feedstocks.

Using techniques and equipment known in the art, the aromatics-containing reactor effluent usually is passed through a cooling zone to a separation zone. In the separation zone, typically maintained at about 0° to 65° C., a hydrogen-rich gas is separated from a liquid phase. The resultant hydrogen-rich stream can then be recycled through suitable compressing means back to the reforming reactors. The liquid phase from the separation zone is normally withdrawn and processed in a fractionating system in order to adjust the concentration of light hydrocarbons and produce an aromatics-containing reformate product.

EXAMPLES

The following examples are presented to demonstrate the present invention and to illustrate certain specific embodiments thereof. These examples should not be construed to limit the scope of the invention as set forth in the claims. There are many possible other variations, as those of ordinary skill in the art will recognize, which are within the spirit of the invention.

Three parameters are especially useful in evaluating reforming process and catalyst performance, particularly in evaluating catalysts for dehydrocyclization of paraffins. "Activity" is a measure of the catalysts ability to convert reactants at a specified set of reaction conditions. "Selectivity" is an indication of the catalyst's ability to produce a high yield of the desired product. "Stability" is a measure of the catalyst's ability to maintain its activity and selectivity over time. The examples illustrate the effect of the invention especially on reforming catalyst activity and selectivity.

The same feedstock was used in all of the following tests, and had the following characteristics:

| Sp. gr. | | 0.736 |
|---|---|---|
| ASTM D-86, ° C.: | IBP | 83 |
| | 10% | 93 |
| | 50% | 112 |
| | 90% | 136 |
| | EP | 161 |
| Mass %: | | |
| | Paraffins | 60.4 |
| | Naphthenes | 26.7 |
| | Aromatics | 12.9 |

Example I

A series of boria-alumina catalysts having a range of aluminum-to-boron ("Al/B") ratios was prepared. In each case, starting materials comprised aluminum nitrate and boric acid in a ratio to effect the Al/B ratios shown below. The combination of aluminum nitrate and boric acid was combined with distilled water and ammonium hydroxide to effect a pH of about 8. A boria-alumina precipitate was formed, recovered, and washed with water. The washed precipitate was dried at 100° C. and calcined at 600° C.

An extruded gamma alumina base of the prior art was prepared as a control for testing of the boria-alumina samples.

The calcined precipitates had the following characteristics:

| | Al/B, mole | Surface Area, m²/g |
|---|---|---|
| Composite A | 1.2 | 185 |
| Composite B | 1.5 | 240 |
| Composite C | 1.6 | 250 |
| Composite D | 1.8 | 279 |
| Composite E | 2.6 | 379 |
| Composite F | 5.6 | 375 |
| Composite G | 14.2 | 356 |
| Control X | ∞ | 214 |

Example II

The catalytic activity of the Example I composites was determined by a 1-heptene reaction test. Each of the composites as 40–60 mesh particles was pretreated at 200° C. for 0.5 hr and 550° C. for 1 hr in a stream of hydrogen and loaded as a 250 mg sample into a microreactor. The test on 1-heptene was carried out at 425° C. at a base rate of 250 cc/min. Most of the conversion resulted in isomerized or cracked products, as shown below, along with a small amount of cyclization. Results were as follows in mass-%, averaging values at the beginning and ending of the test at the 250 cc/min rate:

| | Conversion | Isomerization | Cracking |
|---|---|---|---|
| Composite A | 49.4 | 40.2 | 8.8 |
| Composite B | 54.0 | 46.6 | 7.1 |
| Composite C | 73.0 | 63.2 | 9.4 |
| Composite D | 93.5 | 39.9 | 52.6 |
| Composite E | 94.0 | 35.4 | 57.4 |
| Composite F | 92.8 | 40.6 | 51.1 |
| Composite G | 63.3 | 51.6 | 10.0 |
| Control X | 55.5 | 44.5 | 3.1 |

Propane and butane, indicative of Brönsted acidity, amounted to 93–95 mass-% of the cracked products in all cases except for Composite G, for which the proportion was about 85 mass-%, and Control X, for which the proportion averaged about 37 mass-%.

Example III

The acidity of four of the samples was studied further via Magnetic Angle Spinning Nuclear Magnetic Resonance (MASNMR). The $^{31}P$ proton-decoupled MASNMR spectra at trimethylphosphine (TMP) exposure were determined and are shown in FIG. 1. The amounts of TMP absorbed are as follows in mmol/g:

| Composite A | 0.054 |
|---|---|
| Composite B | 0.041 |
| Composite F | 0.181 |
| Composite G | 0.180 |

The Brönsted acid site line near −5 ppm and the Lewis acid site line around −45 to −50 ppm are clearly observed. Composites A and B show both small Brönsted and Lewis acid sites, while Composite G shows a larger Lewis acid site concentration. The intensity of the Brönsted acid site line is largest for Composite F. Control X showed no Brönsted acidity by TMP MASNMR.

Example IV

Pilot-plant tests were carried out to determine the utility of boria-alumina particles in a catalyst system of the invention comprising a physical mixture of such particles with particles containing a largepore zeolite and platinum. The boria-alumina ratio was intermediate to those of Composites E and F, having an Al/B molar ratio of about 3.3. The largepore zeolite was potassium-form L-zeolite, and the platinum content of the corresponding particles was about 0.8 mass-%. The physical mixture of the invention comprised 80 mass-% platinum on L-zeolite and 20 mass-% boria-alumina.

A control mixture was prepared and tested using α-alumina, known to be nearly neutral in acidity, and the same potassium-form L-zeolite containing 0.8% platinum as described above. The control physical mixture comprised 80 mass-% platinum on L-zeolite and 20 mass-% α-alumina.

One reforming pilot-plant test was carried out on the physical mixture of the invention and two tests were effected on the control mixture. The naphtha feedstock to reforming was as described above, and operating conditions in each case were approximately as follows:

| | |
|---|---|
| Pressure, atmospheres | 8 |
| Hydrogen/hydrocarbon, mol | 8 |
| Mass hourly space velocity, hr$^{-1}$ | 5 |

Temperature was varied over each of the pilot-plant runs from 480° to 525° C. at 15° C. intervals.

Figure 2:
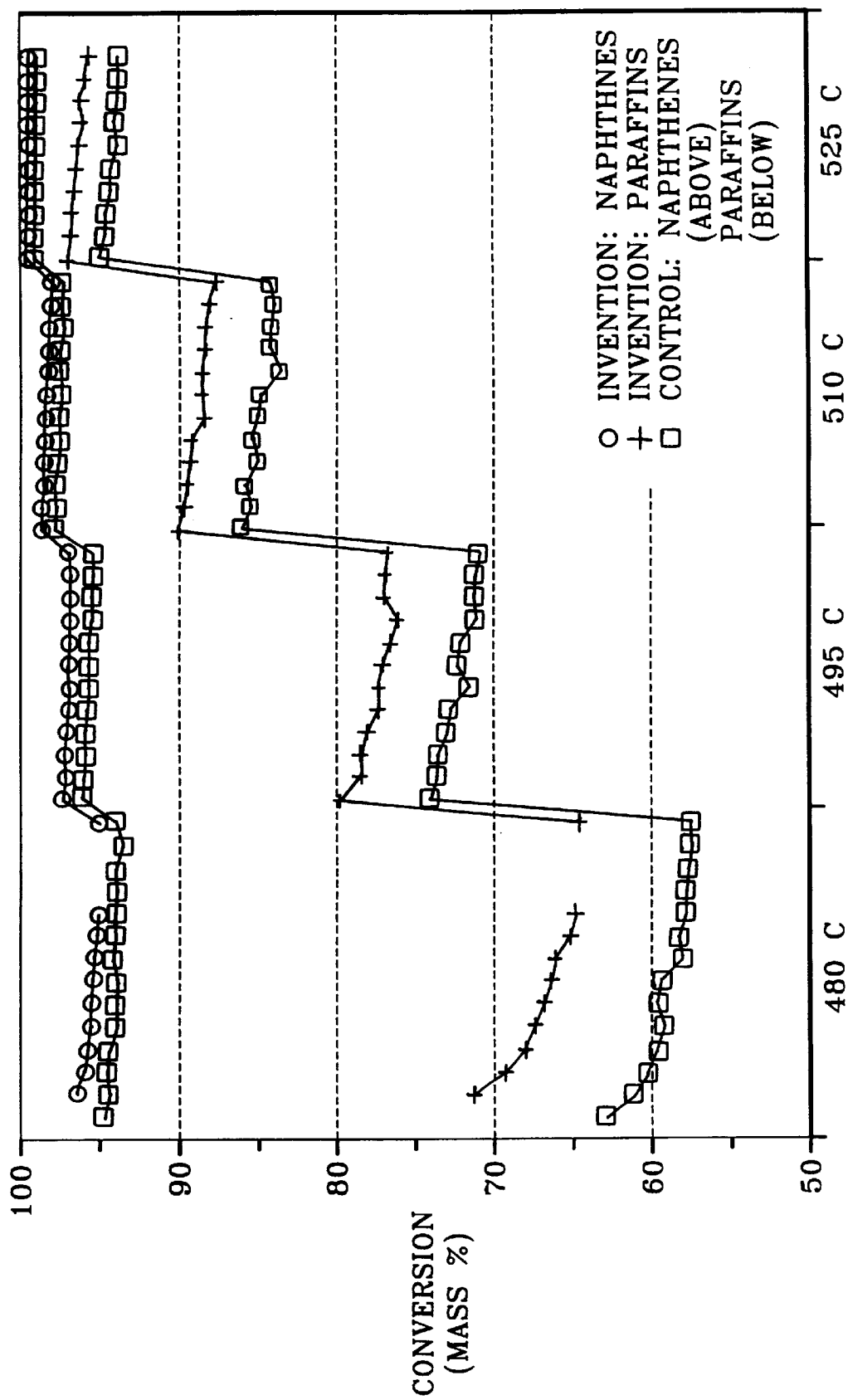
FIG. 2 is a graph of the variation in conversion as a function of temperature when reforming naphtha with a physical mixture of non-acidic L-zeolite and boria-alumina particles in comparison to a control mixture.

FIG. 2 shows the variation in conversion during each of the pilot-plant runs as a function of temperature. Conversion of naphthenes, which was in the middle-to-upper 90%s in all cases, was higher for the catalyst system of the invention at all temperatures. At each of the temperatures, conversion of paraffins was sufficiently higher using the catalyst system of the invention to result in a reduction of 15–20% in unconverted paraffins in the product compared to the control.

Figure 3:
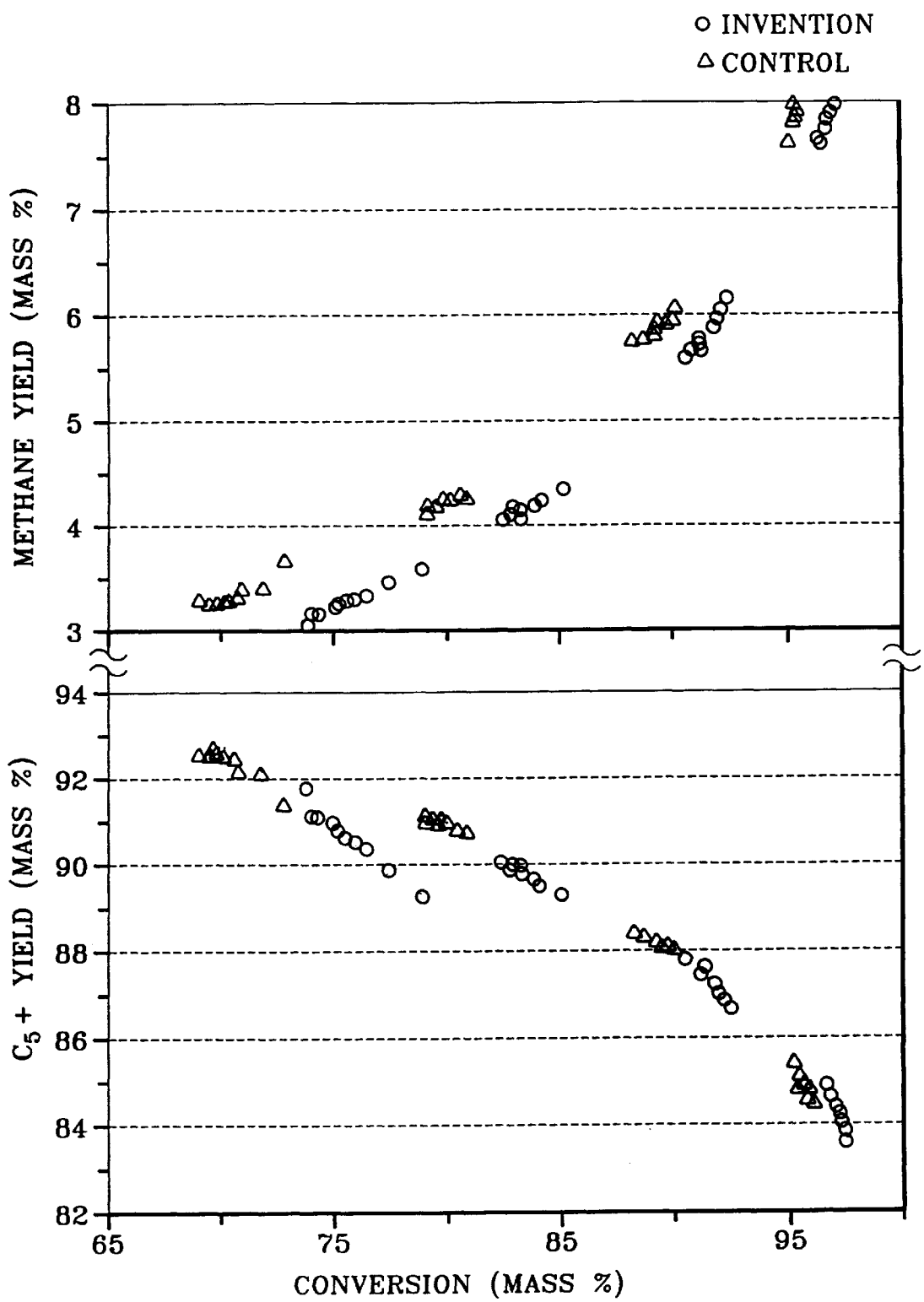
FIG. 3 is a graph of $C_5+$ and methane yield from reforming as a function of conversion for the same mixtures of the invention and the art as represented in FIG. 2.

FIG. 3 shows a plot of $C_5$+ yield (yield of pentanes and heavier hydrocarbons) vs. conversion of total paraffins and naphthenes for catalyst systems of the invention and the control. $C_5$+ yield for the catalyst system of the invention averaged slightly lower values at lower conversion and slightly higher at higher conversion than the control.

Also shown in FIG. 3 is a comparison of methane yield as a function of conversion for the various catalyst systems. The mixture of the invention shows a substantially lower methane yield, indicating substantially less cracking to light gases according to the invention.

Figure 4:
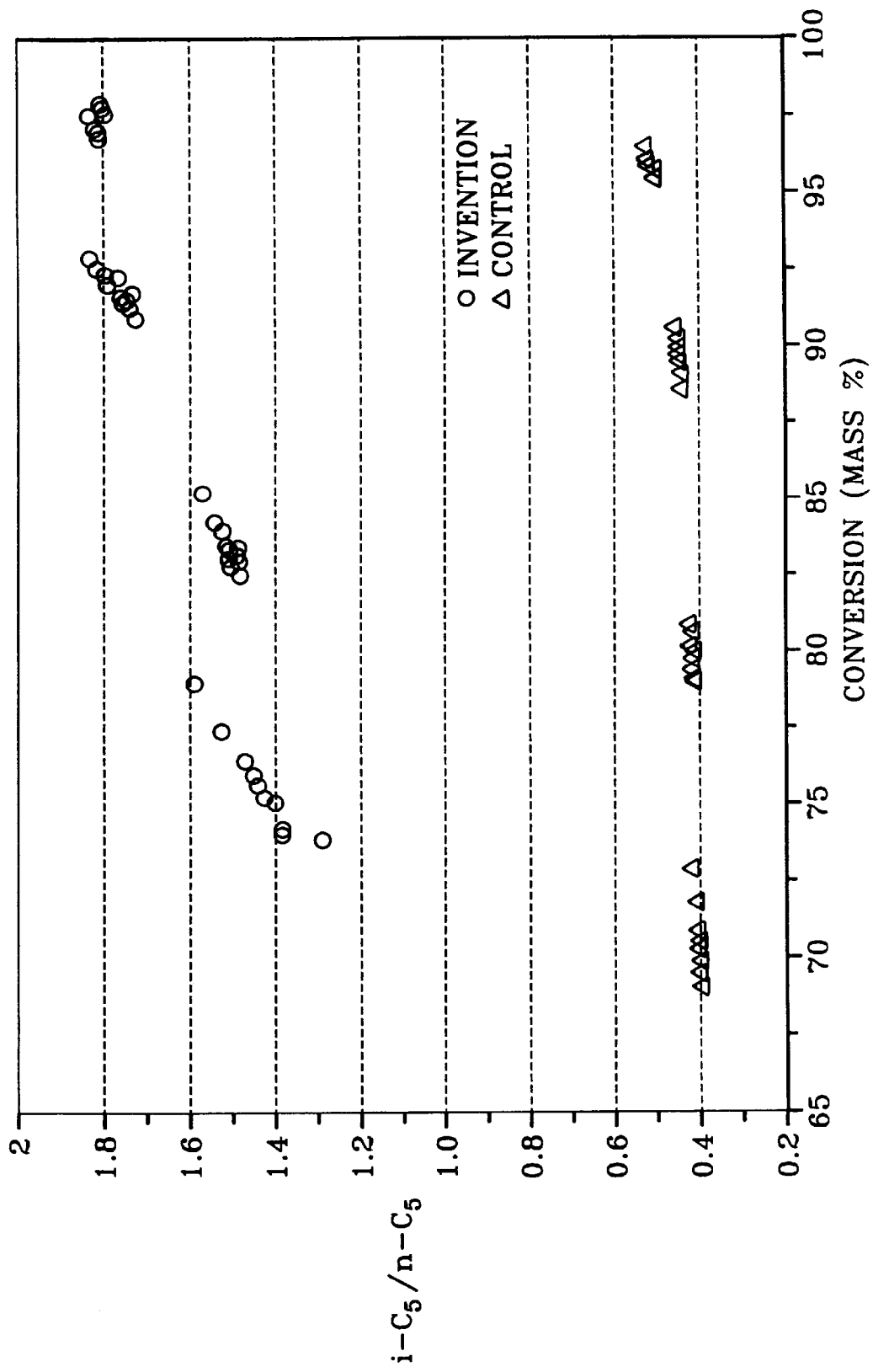
FIG. 4 illustrates isopentane/n-pentane ratios of reforming product as a function of conversion for the same mixtures as represented in FIG. 2.

FIG. 4 compares isopentane/n-pentane ratios from the catalyst system of the invention and the control. The invention results in a substantially higher iso- to normal-paraffin ratio, consistent with the desirability of isoparaffins in current reformulated gasolines.

Figure 5:
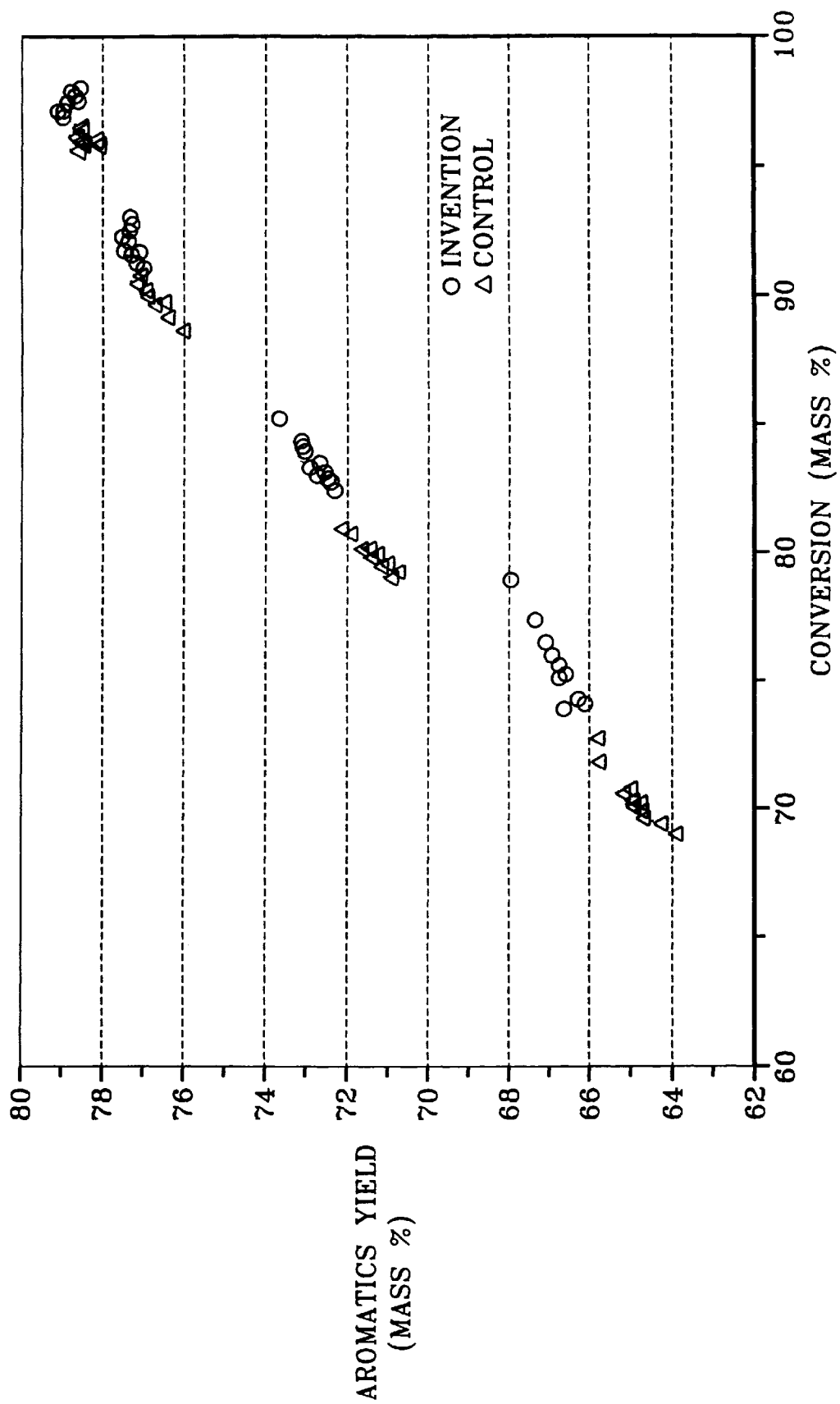
FIG. 5 illustrates overall aromatics yields as a function of conversion for the same mixtures as represented in FIG. 2.

FIG. 5 shows aromatics yields as a function of conversion. Aromatics yields are substantially the same at higher conversion for the physical mixture of the invention relative to the control, but average slightly lower at lower conversion. Benzene yield for the system of the invention is 1–1½% lower, and the invention thus results in an increase in the relative yield of alkylaromatics (e.g., xylenes).

Example V

Two silica-alumina composites having different ratios of silica to alumina were prepared, tested to determine acidity characteristics, and used in a physical mixture to reform naphtha.

Composite Y premix was prepared in the following manner. A solution of 501 g water glass (30% $SiO_2$, 8.2% $Na_2O$) and 250 g water was added dropwise to a solution of 341 g 1:1 HCl containing 31.4 g urea powder. Al sol, 1.37 Al/Cl @ 15% Al, was added in an amount of 174 g, followed by 39 g of 42% hexamethylenetetramine, to the acidified water glass solution.

Composite Z premix was prepared in the following manner. A solution of 247 g water glass (30% $SiO_2$, 8.2% $Na_2O$) and 280 g water was added dropwise to a solution of 148 g 1:1 HCl containing 64 g urea powder. Al sol, 1 45 Al/Cl @ 14% Al, was added in an amount of 476 g to the acidified water glass solution.

Each of the Composites Y and Z premix was filtered, oil dropped and aged in oil at 95° C. for 18 hours. The spheres were subjected to a displacement solution containing 0.5% $NH_4NO_3$, then washed with water containing 0.5% $NH_4NO_3$ and $NH_3$, dried at 100° C. and calcined at 650° C. in 3% steam.

Composite Y comprised silica and alumina in a mass ratio of about 75/25, and Composite Z comprised about 37 mass-% silica and 63 mass-% alumina. Conversion of 1-heptene with Composite Y according to the parameters of Example II yielded the following results indicating the presence of Brönsted acidity:

| | |
|---|---|
| Conversion | 91.8% |
| Isomerization | 41.6% |
| Cracking | 48.6% |
| Propane and butane * | 88.5% |

* As a proportion of cracked product

Example VI

Pilot-plant tests were carried out to determine the utility of silica-alumina particles in a catalyst system of the invention comprising a physical mixture of such particles with particles containing a large-pore zeolite and platinum. Particles of both Composite Y and Composite Z were tested. The large-pore zeolite was potassium-form L-zeolite, and the platinum content of the corresponding particles was about 0.8 mass-%. The physical mixture of the invention comprised 80 mass-% platinum on L-zeolite and 20 mass-% silica-alumina.

A control mixture comprising 80 mass-% platinum on L-zeoliteand 20 mass-% α-alumina was employed as discussed in Example IV.

One reforming pilot-plant test was carried out on the physical mixture of the invention and compared with results when processing the control mixture. The naphtha feedstock to reforming was as described above, and operating conditions in each case were approximately as follows:

| | |
|---|---|
| Pressure, atmospheres | 8 |
| Hydrogen/hydrocarbon, mol | 8 |
| Mass hourly space velocity, hr$^{-1}$ | 5 |

Temperature was varied over each of the pilot-plant runs from 480° to 525° C. at 15° C. intervals.

Figure 6:
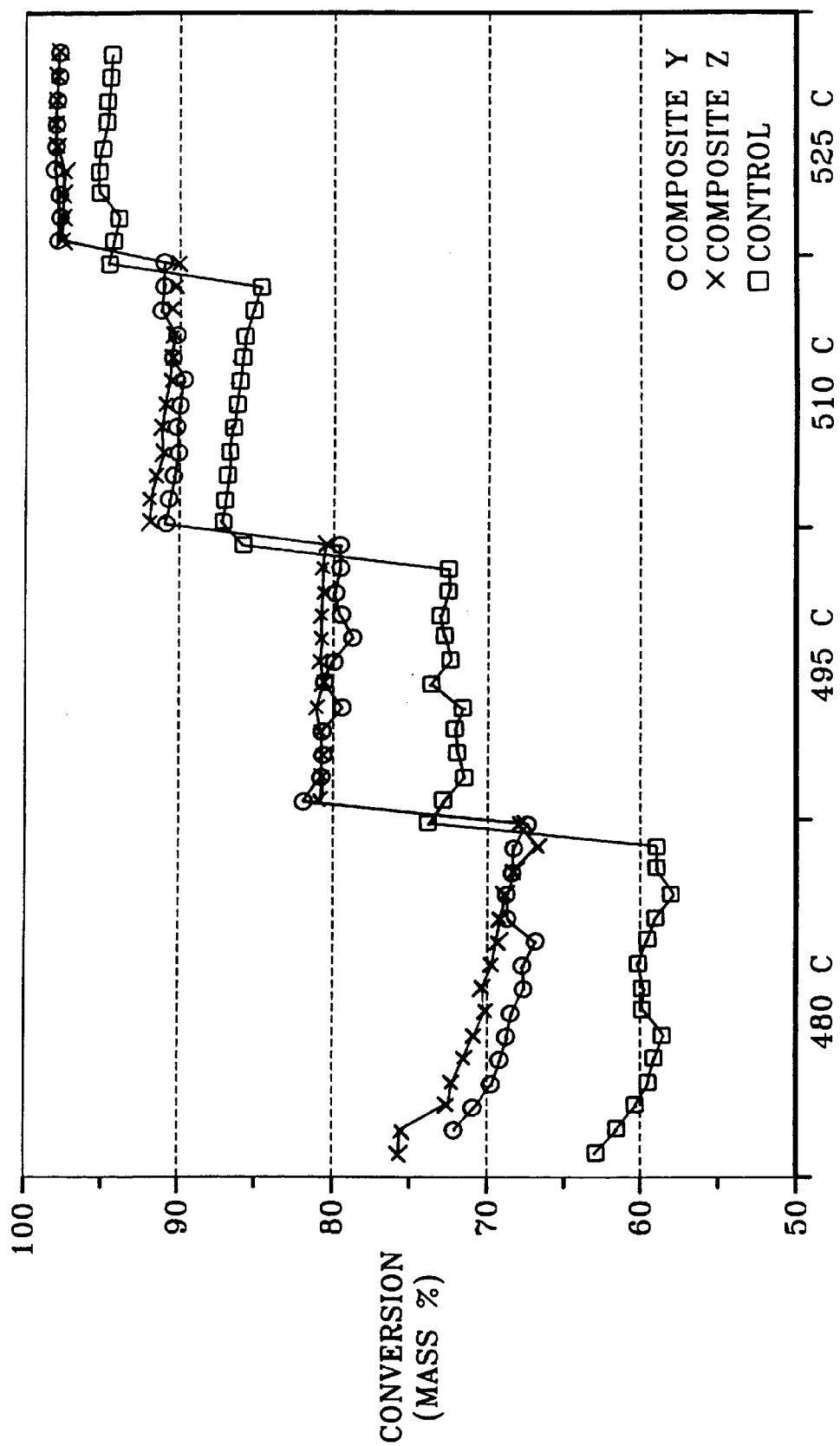
FIG. 6 is a graph of the variation in conversion as a function of temperature when reforming naphtha with a physical mixture of non-acidic L-zeolite and silica-alumina particles in comparison to a control mixture.

FIG. 6 shows the variation in conversion during each of the pilot-plant runs as a function of temperature. The plot is based on overall conversion of paraffins and naphthenes in the feedstock. Conversion was clearly higher for the catalyst system of the invention, comprising silica-alumina Composites Y and Z, at all temperatures.

Figure 7:
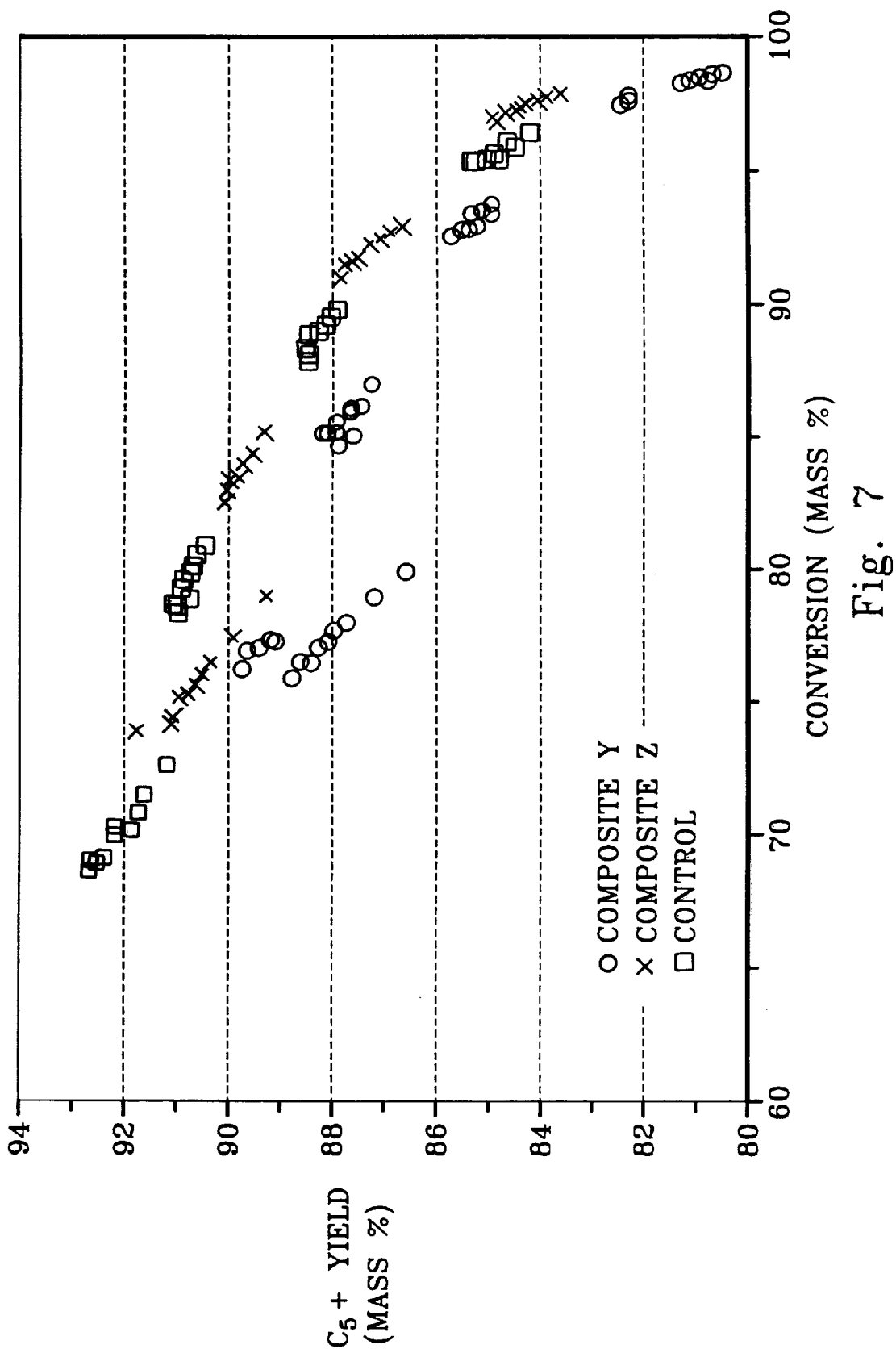
FIG. 7 is a graph of $C_5+$ yield from reforming as a function of conversion s for the same mixtures of the invention and the art as represented in FIG. 6.

FIG. 7 shows a plot of $C_5+$ yield (yield of pentanes and heavier hydrocarbons) vs. conversion of total paraffins and naphthenes for catalyst systems of the invention and the control. $C_5+$ yield was lower particularly at low conversion for the catalyst system comprising Composite Y, but yields for the catalyst system comprising Composite Z were comparable to those of the control.

Example VII

Figure 8:
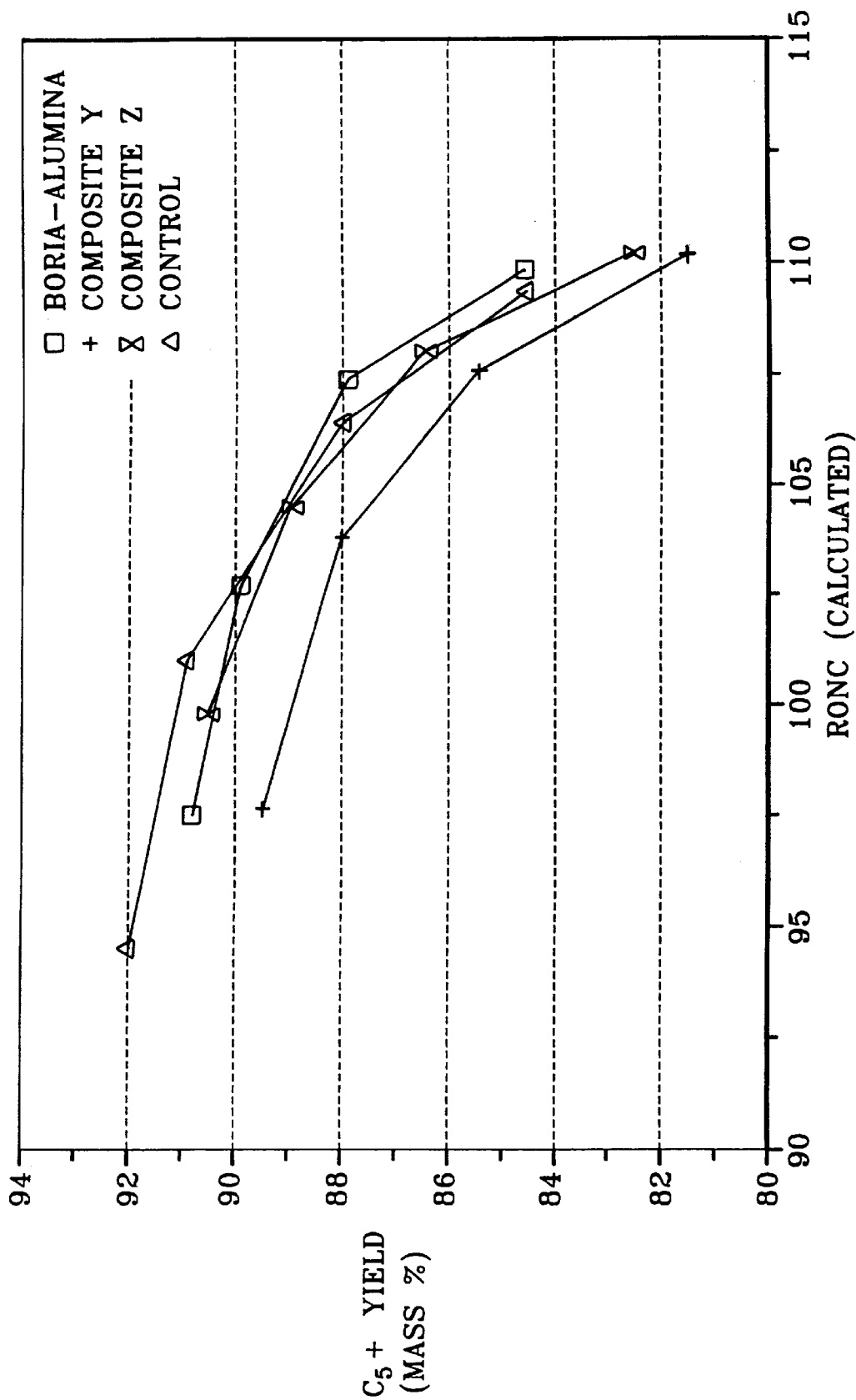
FIG. 8 illustrates $C_5+$ yield as a function of product octane number for the mixtures represented in FIG. 2 and in FIG. 6.

FIG. 8 is an expression of $C_5+$ product yields as a function of product octane number for catalyst systems of the invention and the control. The $C_5+$ yields are as shown in FIGS. 2 and 6, expressed to indicate a measure of efficiency of gasoline production.

The higher activity of catalyst systems of the invention demonstrated for catalyst systems of the invention is accompanied by more favorable yields at high severity when employing alumina-boria (3.3 A/B) as the acidic component of the physical mixture. The high-silica Composite Y showed lower yields as a function of product octane, but yield efficiency for Composite Z in the mixture was comparable to that of the control.

We claim:

1. A process for the catalytic reforming of a hydrocarbon feedstock comprising contacting a combined feed comprising the hydrocarbon feedstock and free hydrogen at reforming conditions comprising a pressure of from about 100 kPa to 2 MPa, a temperature of from about 260° to 560° C., a liquid hourly space velocity of from about 1 to 40 hr$^{-1}$, and a hydrogen to hydrocarbon ratio of from about 0.1 to 10 moles of hydrogen per mole of hydrocarbon with a catalyst system comprising a physical particle-form mixture of:
   (a) first particles of a catalytic composite comprising a non-acidic large-pore zeolite and a platinum-group metal component; and,
   (b) second acidic particles consisting essentially of two or more refractory inorganic oxides and having the substantial absence of a platinum-group metal.

2. The process of claim 1 wherein the hydrocarbon feedstock comprises a raffinate from aromatics extraction.

3. The process of claim 1 wherein the pressure is below 1 MPa.

4. The process of claim 1 wherein the second particles consist essentially of alumina and boria in a mass ratio respectively of from about 1:1 to 100:1.

5. The process of claim 1 wherein the second particles comprise silica and alumina in a mass ratio respectively of from about 20:1 to 1:100.

6. The process of claim 1 wherein the catalyst system further comprises particles containing one or more manganese oxides.

7. A process for the catalytic reforming of a hydrocarbon feedstock comprising contacting a combined feed comprising the hydrocarbon feedstock and free hydrogen at reforming conditions comprising a pressure of from about 100 kPa to 2 MPa, a temperature of from about 260° to 560° C., a liquid hourly space velocity of from about 1 to 40 hr$^{-1}$, and a hydrogen to hydrocarbon ratio of from about 0.1 to 10 moles of hydrogen per mole of hydrocarbon with a catalyst system comprising a physical particle-form mixture of:
   (a) first particles of a catalytic composite comprising non-acidic L-zeolite, an alkali-metal component and a platinum component; and,
   (b) second particles demonstrating the presence of Brönsted acidity and consisting essentially of alumina and one or more inorganic oxides selected from the group consisting of boria, silica, titania and zirconia.

* * * * *